(12) United States Patent
Kim

(10) Patent No.: US 10,486,745 B1
(45) Date of Patent: Nov. 26, 2019

(54) INTEGRAL TYPE FRONT-END MODULE

(71) Applicants: Hyundai Motor Company, Seoul (KR); Kia Motors Corporation, Seoul (KR)

(72) Inventor: Do Hoi Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/163,861

(22) Filed: Oct. 18, 2018

(30) Foreign Application Priority Data

Jul. 27, 2018 (KR) .................. 10-2018-0087775

(51) Int. Cl.
*B62D 21/15* (2006.01)
*B60R 19/34* (2006.01)
*B60R 19/12* (2006.01)

(52) U.S. Cl.
CPC ............ *B62D 21/152* (2013.01); *B60R 19/12* (2013.01); *B60R 19/34* (2013.01)

(58) Field of Classification Search
CPC ........ B62D 21/152; B60R 19/12; B60R 19/34
USPC ................. 296/193.09, 193.1, 187.09
See application file for complete search history.

(56) References Cited

U.S. PATENT DOCUMENTS

| | | | | |
|---|---|---|---|---|
| 6,814,400 | B2* | 11/2004 | Henderson | B62D 29/001 180/68.4 |
| 8,998,306 | B2* | 4/2015 | Guyomard | B62D 21/152 296/193.09 |
| 2013/0264841 | A1* | 10/2013 | Gillard | B62D 25/08 296/193.09 |
| 2015/0314811 | A1* | 11/2015 | Shibata | B62D 25/082 296/193.09 |

FOREIGN PATENT DOCUMENTS

| | | |
|---|---|---|
| KR | 10-0507657 B1 | 8/2005 |
| KR | 10-0829889 B1 | 5/2008 |
| KR | 10-2011-0052525 A | 5/2011 |
| KR | 10-1096052 B1 | 12/2011 |

* cited by examiner

*Primary Examiner* — Joseph D. Pape
(74) *Attorney, Agent, or Firm* — Mintz Levin Cohn Ferris Glovsky and Popeo, P.C.; Peter F. Corless

(57) ABSTRACT

An integral type front-end module is provided. The integral type front-end module includes a frame having an upper member, a lower member, and a pair of vertical members that connect the upper and lower members. The integral type front-end module also includes a horizontal back beam that connects the vertical members, a first vertical back beam that connects middle portions of the upper member and the lower member, and a pair of second vertical back beams, each disposed between one of the vertical members and the first vertical back beams. In particular, the horizontal back beam, the first vertical back beam, and the second vertical back beams are formed integrally.

14 Claims, 6 Drawing Sheets

INTEGRAL TYPE FRONT-END MODULE

CROSS REFERENCE TO RELATED APPLICATION

The present application claims priority to Korean Patent Application No. 10-2018-0087775, filed Jul. 27, 2018, the entire contents of which is incorporated herein by reference.

BACKGROUND

Field of the Invention

The present invention relates generally to an integral type front-end module, and more particularly, to an integral type front-end module, which is disposed at the front of a vehicle to absorb external impact.

Description of the Related Art

A front-end module (FEM) is generally disposed at the front of a vehicle to absorb the amount of impact that occurs during a frontal collision and to minimize the amount of impact that is transmitted to the inside of the vehicle body through side members. The amount of impact applied to the FEM is transmitted to collision boxes installed on the left and right sides of the vehicle body, and the collision boxes buckle to absorb the amount of impact, and the remaining amount of impact is then transmitted to the vehicle body via the side members.

However, since next-generation vehicles, such as an electric vehicle, use a short overhanging vehicle body, in which an engine compartment is designed to be small while the interior space is expanded, it is difficult to have a sufficient distance to absorb the amount of impact in a frontal collision, and thus, as the collision boxes break, a substantial amount of impact is transmitted to the vehicle body, compressing the interior space, thereby increasing the risk of injury to occupants.

In particular, since a conventional FEM has a single back beam connected to the left and right collision boxes to transmit the amount of impact applied to the back beam to the collision boxes through a single load path, the conventional FEM fails to absorb the amount of impact due to breakage of the back beam or the collision box instead of buckling. Therefore, there is a need for a front-end module structure capable of absorbing the amount of impact while preventing breakage even when a strong impact occurs.

The foregoing is intended merely to aid in the understanding of the background of the present invention, and is not intended to mean that the present invention falls within the purview of the related art that is already known to those skilled in the art.

SUMMARY

The present invention provides an integral type front-end module, which may distribute the amount of generated impact by a plurality of load paths and may be prevented from breakage thereof, thereby efficiently absorbing the amount of impact.

In order to achieve the above object, an integral type front-end module according to an exemplary embodiment of the present invention may include a frame having an upper member, a lower member, and a pair of vertical members that connect the upper member and the lower member to form a quadrangular frame shape. The integral type front-end module may also include a horizontal back beam that connects the pair of vertical members to form a load path that transmits an impact applied when a collision occurs to the vertical members; a first vertical back beam that connects a middle portion of the upper member and a middle portion of the lower member to form a load path that transmits the impact to the vertical members through the upper member and the lower member; and a pair of second vertical back beams, each disposed between one of the vertical members and the first vertical back beams to connect the upper member and the lower member to each other, and forming a load path that transmits the impact to the vertical members through the upper member and the lower member. The frame, the horizontal back beam, the first vertical back beam, and the second vertical back beams may be formed integrally.

The horizontal back beam may connect middle portions of the pair of vertical members to each other. Further, the horizontal back beam may include a pair of straight portions that extend from the middle portions of the vertical members toward a front of a vehicle to form a load path connected to a side member, and a curved portion provided between the pair of straight portions and curved to gradually protrude toward the front of the vehicle. The first vertical back beam may be formed in a curved shape wherein a middle portion thereof gradually protrudes toward the front of the vehicle from both ends thereof. Further, a middle portion of the horizontal back beam and a middle portion of the first vertical back beam may be integrally formed to cross each other.

In particular, based on a distance between one of the vertical members and the first vertical back beam, each of the second vertical back beams may be disposed at a location of about 45-55% of the distance from a corresponding vertical member. Further, each of the second vertical back beams may be formed in a curved shape wherein a middle portion thereof gradually protrudes toward the front of the vehicle from both ends thereof. A middle portion of the horizontal back beam and middle portions of the second vertical back beams may be integrally formed to cross each other.

A portion of each of the frame, the horizontal back beam, the first vertical back beam, and the second vertical back beams that faces a rear direction of a vehicle may be concavely formed and may include a plurality of ribs formed therein. A portion of each of the vertical members that faces a rear direction of a vehicle may be connected to a side member to receive the impact applied to the horizontal back beam, the first vertical back beam, and the second vertical back beams and transmit the impact to the side member.

In particular, the frame, the horizontal back beam, the first vertical back beam, and the second vertical back beams may be made of a fiber reinforced plastic material or a glass fiber reinforced plastic material. Further, each of the second vertical back beams may be disposed at a location that corresponds to a corner of a barrier that collides with a vehicle in an offset collision test.

The integral type front-end module according to the present invention may include the following advantages.

First, a plurality of load paths may be provided, and therefore, breakage of the module due to concentration of the load generated by the impact may be prevented.

Second, the back beam may be integrated into the front-end module, whereby the weight of the module may be reduced.

Third, since the front-end module may be molded as an integrated structure in a mold, manufacturing cost and required labor may be reduced.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein Hereinbelow, integral type front-end module according to an exemplary embodiment of the present invention will be described in detail with reference to the accompanying drawings.

Figure 1:
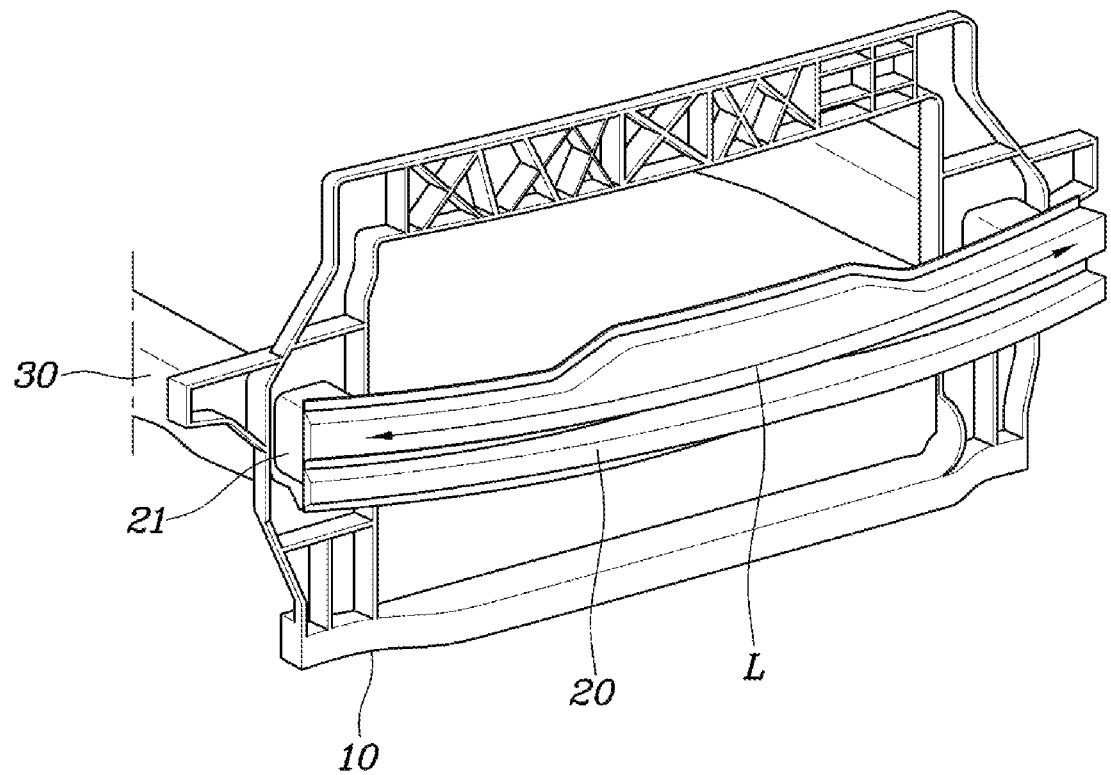
FIG. 1 is a view showing a structure of a conventional front-end module (FEM) in the related art.
Figure 2:
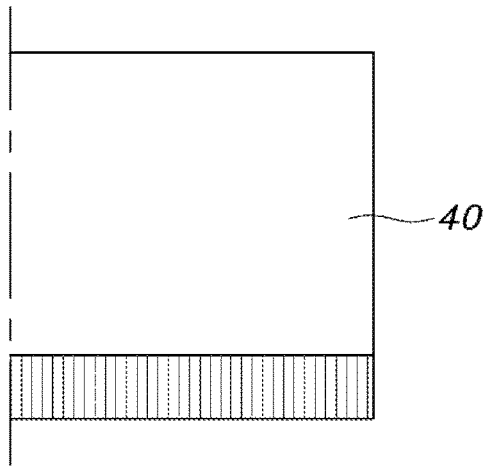
FIG. 2 is a view showing a state where an offset collision test is performed on the structure of the conventional FEM in the related art.
Figure 2:
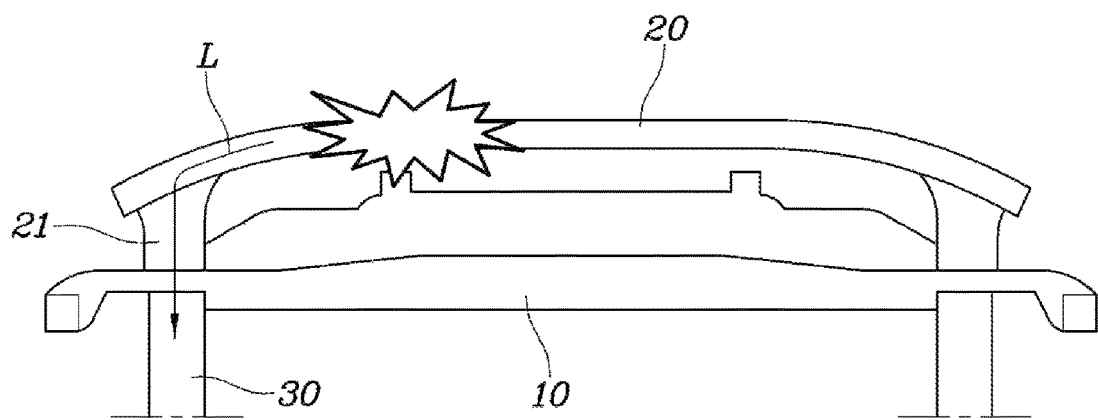

FIG. 1 is a view showing a structure of a conventional front-end module (FEM) in the related art and FIG. 2 is a view showing a state where an offset collision test is performed on the structure of the conventional FEM in the related art. As shown in FIGS. 1 and 2, the structure of the conventional FEM has a back beam 20 provided to cross a quadrangular frame 10 and each of opposite ends of the back beam 20 includes a collision box 21 to be connected to a side member 30 of a vehicle body. Meanwhile, in FIG. 2, a reference numeral 40 denotes a barrier that collides with the vehicle body in the offset collision test.

The frame 10 and the back beam 20 are generally bolted together, and when an impact is applied to the back beam 20, the amount of impact is transmitted to opposite end portions of the back beam 20 and the collision box 21 buckles to attenuate the amount of impact. As the collision box 21 attenuates the amount of impact applied to the back beam 20, the amount of impact transmitted to vehicle body through the side member 30 may be reduced.

However, since a load path L through which the amount of impact applied to the back beam 20 is transmitted is composed of one path, a high load is concentrated on the load path L, which may cause the back beam 20 or the collision box 21 to break. As a result, the amount of impact applied to the back beam 20 is transmitted to the interior without attenuation, which may result in injury to the occupant.

Figure 3:
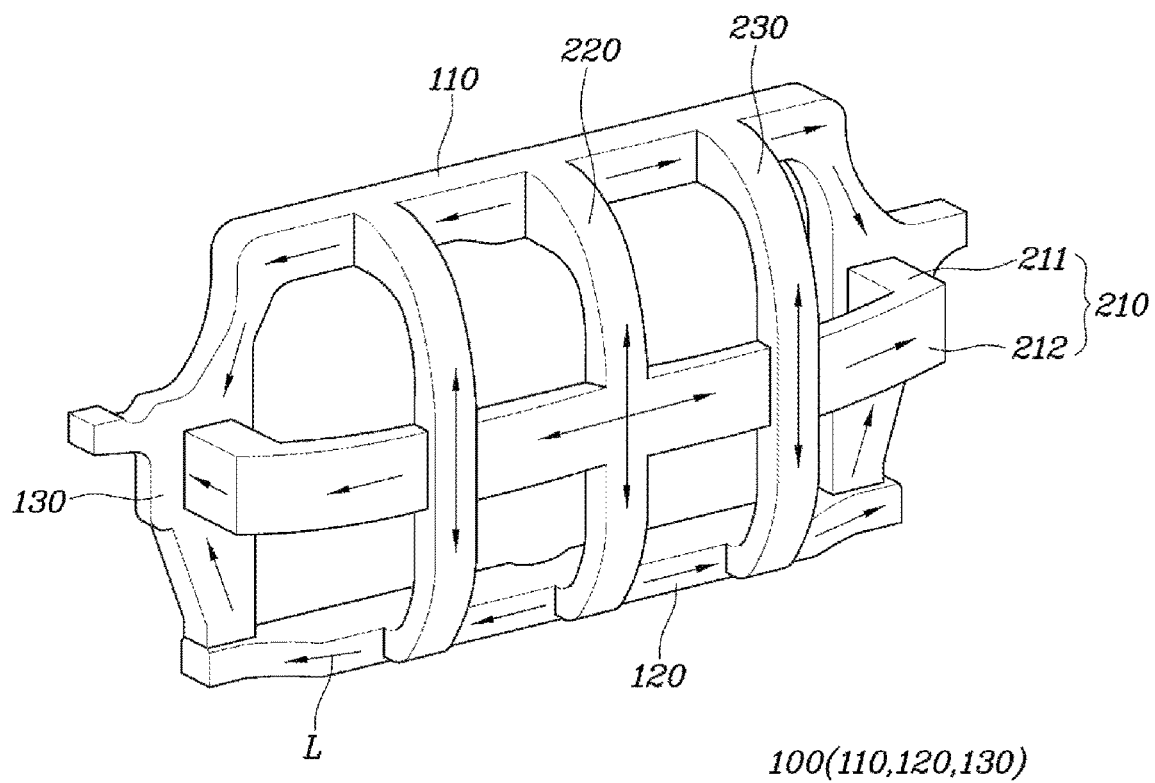
FIG. 3 is a view showing an integral type front-end module according to an exemplary embodiment of the present invention.
Figure 4:
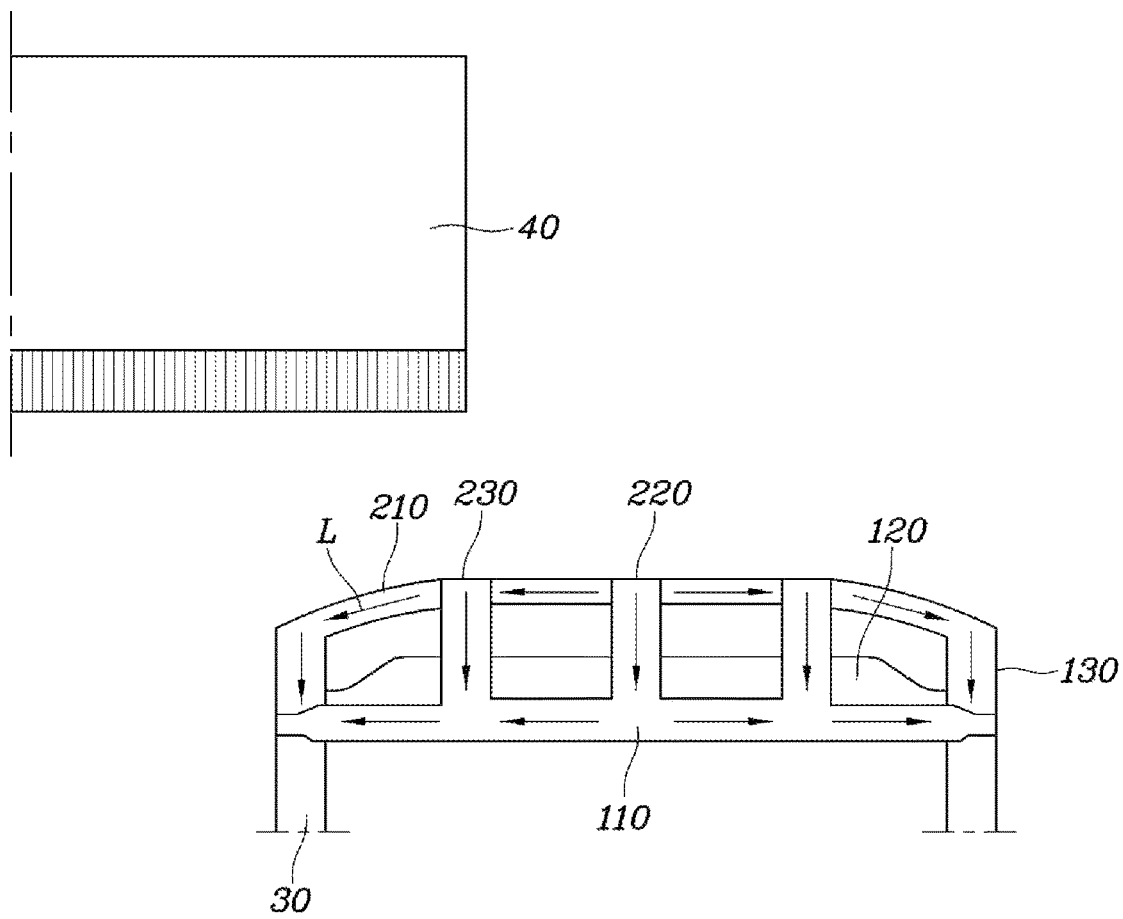
FIG. 4 is a view showing a state where an offset collision test is performed on the integral type front-end module according to an exemplary embodiment of the present invention.
Figure 5:
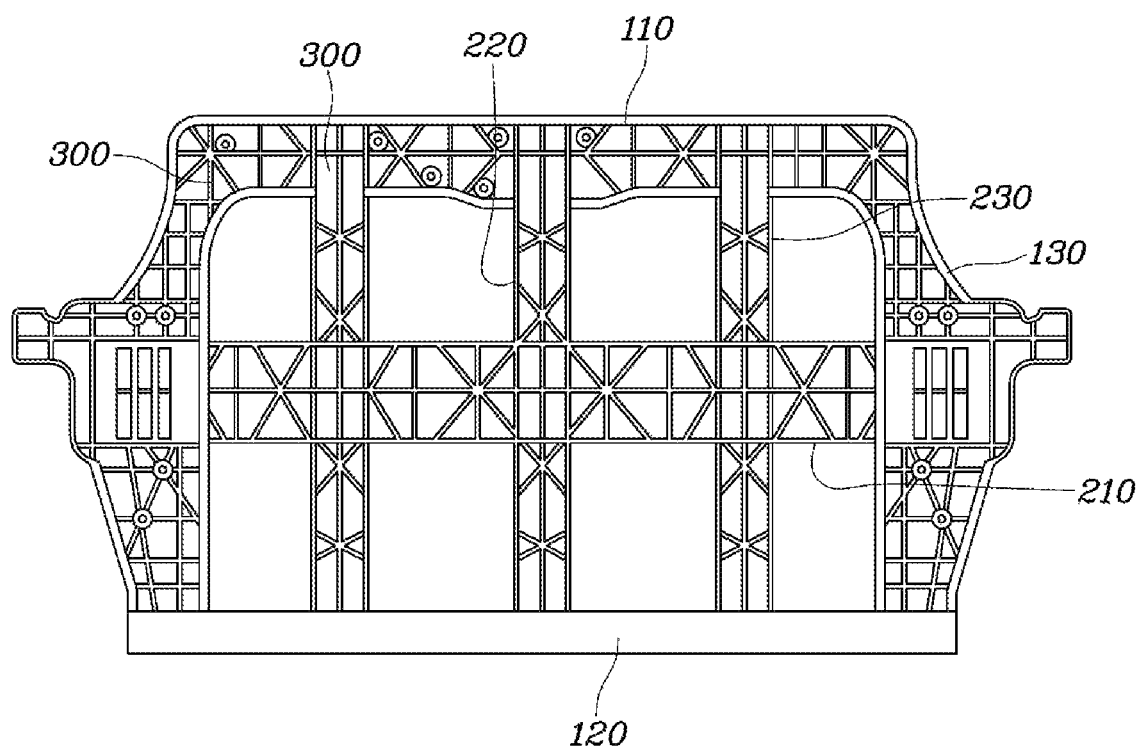
FIG. 5 is a view showing a back surface of the integral type front-end module according to an exemplary embodiment of the present invention.
Figure 6:
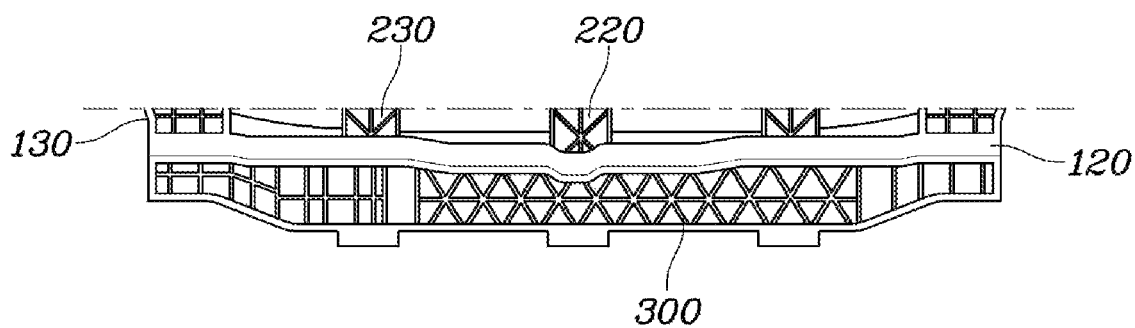
FIG. 6 is a view showing a bottom surface of a lower member of the integral type front-end module according to an exemplary embodiment of the present invention.

FIG. 3 is a view showing an integral type front-end module according to an exemplary embodiment of the present invention; FIG. 4 is a view showing a state where an offset collision test is performed on the integral type front-end module according to an exemplary embodiment of the present invention; FIG. 5 is a view showing a back surface of the integral type front-end module according to an exemplary embodiment of the present invention; and FIG. 6 is a view showing a bottom surface of a lower member of the integral type front-end module according to an exemplary embodiment of the present invention. As shown in FIGS. 3 to 6, an integral type front-end module may include a frame 100, a horizontal back beam 210, a first vertical back beam 220, and a second vertical back beam 230.

The frame 100 may include an upper member 110 that extends in the lateral direction of the vehicle; a lower member 120 that extends in the lateral direction of the vehicle while being spaced downwardly apart from the upper member 110; and a pair of vertical members 130 that connect the end portions of the upper member 110 and the end portions of the lower member 120 vertically. The frame 100 may be formed in a quadrangular frame shape through the upper member 110, the lower member 120, and the vertical members 130.

The side member 30 may be connected to the back of the vertical members 130 to connect the frame 100 to a vehicle body (not shown) via the side member 30. Further, the impact transmitted from the horizontal back beam 210 to be described below, the first vertical back beam 220, and the second vertical back beam 230 to the frame 100 may be transmitted to the vehicle body through the side member 30.

The horizontal back beam 210 may connect a pair of vertical members 130 together, wherein opposite ends thereof are coupled to a middle portion of a first vertical member 130 and a middle portion of a second vertical member 130, respectively. The amount of impact applied to the horizontal back beam 210 may be distributed in the lateral direction of the vehicle along the load path L and may be transmitted in the direction of the frame 100.

Further, the horizontal back beam 210 may be divided into a straight portion 211 formed at a position where the collision box is conventionally disposed, which is a portion where the vertical members 130 and the horizontal back beam 210 of the frame 100 are connected to protrude in the forward direction of the vehicle; and a curved portion 212 formed between the straight portions 211 connected to a pair of vertical members 130, respectively, and curved to gradually protrude toward the middle portion of the horizontal back beam 210 in the forward direction of the vehicle.

Since the middle portion of the horizontal back beam 210 is formed to protrude in the forward direction of the vehicle, even when a collision occurs at the middle portion of the horizontal back beam 210 or a collision occurs at a position near any one end of the horizontal back beam 210 due to the offset collision, the amount of impact may be transmitted to the straight portion 211 along the load path L formed on the curved portion 212 of the horizontal back beam 210, then be reduced when the straight portion 211 is deformed, and may be transmitted to the side member 30.

The first vertical back beam 220 may vertically extend to connect the middle portion of the upper member 110 and the middle portion of the lower member 120, and the second vertical back beam 230 may vertically extend to connect a portion between the middle portion and the end portion of the upper member 110 and a portion between the middle portion and the end portion of the lower member 120. The middle portion of the first vertical back beam 220 and the middle portions of the second vertical back beams 230 may be integrally formed with the curved portion 212 of the horizontal back beam 210, whereby the amount of impact applied to the horizontal back beam 210 may be transmitted through the load path L formed on the horizontal back beam 210 and also through the load path L formed on the first vertical back beam 220 and the second vertical back beams 230.

As described above, the first vertical back beam 220 and the second vertical back beams 230 may distribute the amount of impact applied to the horizontal back beam 210 to the upper member 110 and the lower member 120, whereby the amount of impact transmitted from the horizontal back beam 210 to the vertical members 130 of the frame 100 may be reduced. as Accordingly, breakage caused by a load transmitted to the horizontal back beam 210 and the vertical members 130 may be prevented.

The first vertical back beam 220 and the second vertical back beam 230 may be formed in a curved shape wherein a middle portion gradually protrudes toward the front of the vehicle from opposite end portions thereof. Since the middle portions of the first vertical back beam 220 and the second vertical back beam 230 are formed to protrude in the forward direction of the vehicle, a load path L may be formed to more smoothly transmit the amount of impact applied to the horizontal back beam 210 to the upper member 110 and the lower member 120 through the first vertical back beam 220 and the second vertical back beam 230.

Accordingly, the amount of impact applied to the horizontal back beam 210 may be transmitted to the vertical members 130 via the upper member 110 and the lower member 120 without being concentrated on the connecting portions between the horizontal back beam 210 and the vertical members 130 of the frame 100. Thus, breakage caused by a load concentrated on the horizontal back beam 210, the curved portion 212, and the straight portion 211 may be prevented.

Moreover, the horizontal back beam 210 and the first vertical back beam 220 or the second vertical back beam 230 may be coupled to be in a cross shape. When the first vertical back beam 220 or the second vertical back beam 230 is coupled to the front or back surface of the horizontal back beam 210, the load path L by which the amount of impact applied to the horizontal back beam 210 is transmitted to the first vertical back beam 220 or to the second vertical back beam 230 may be formed to increase the load transmitted from the horizontal back beam 210 to the vertical members 130. Accordingly, to linearize the path of load path L, the coupling portions of the horizontal back beam 210, the first vertical back beam 220, and the second vertical back beam 230 may be crossed (e.g., intersected) to be in a cross shape, and the front surfaces and back surfaces thereof may be integrally formed as an even surface.

The second vertical back beam 230 may be disposed between the vertical member 130 and the first vertical back beam 220 and may be disposed at a location spaced apart about 45-55% of the distance from a corresponding vertical member based on a distance between one of the vertical members 130 and the first vertical back beam 220. In other words, the second vertical back beam 230 may be disposed at a substantially central position between the vertical members 130 and the first vertical back beam 220, whereby even if a collision occurs at any position of the horizontal back beam 210, the amount of impact may be transmitted to the upper member 110 and the lower member 120 through the first vertical back beam 220 and the second vertical back beam 230.

In particular, the second vertical back beam 230 may be formed proximate to the central position between the first vertical back beam 220 and the vertical member 130 to approximate the corner of a barrier 40 that collides with the vehicle body in the offset collision test to the position of the second vertical back beam 230 and to minimize the amount of impact transmitted to the interior space of the vehicle during the offset collision test. Thus, in the event of an offset frontal collision due to a centerline encroachment or the like that may occur during the vehicle operation, the amount of impact transmitted to the interior space of the vehicle may be minimized to protect the driver and occupants.

When the position of the second vertical back beam 230 is closer to the vertical member 130 than the above range (e.g., about 45-55%), the load path through which the load is transmitted to the upper member 110 and the lower member 120 may not be formed smoothly when a collision occurs at the middle portion of the horizontal back beam 210, and the load may be concentrated at the connecting portion between the horizontal back beam 210 and the vertical members 130. When the position of the second vertical back beam 230 is closer to the first vertical back beam 220 than the above range (e.g., about 45-55%), the position of the second vertical back beam 230 may be separated from the corner position of the barrier 40 during the offset collision test, the amount of impact applied to the corner of the horizontal back beam 210 may be concentrated on the vertical members 130 without being transmitted to the upper member 110 and the lower member 120.

Accordingly, when the position of the second vertical back beam 230 is beyond the above range (e.g., about 45-55%), breakage may occur at the connecting portion of the horizontal back beam 210 and the vertical members 130, thus failing to attenuate the amount of impact. Therefore, the amount of impact transmitted to the interior space of the vehicle may increase increasing the risk of injury to the driver and occupants.

Furthermore, the frame 100, the horizontal back beam 210, the first vertical back beam 220, and the second vertical back beams 230 may be integrally formed.

The frame 100, the horizontal back beam 210, the first vertical back beam 220, and the second vertical back beams 230 may be, for example, of a fiber reinforced plastic (FRP) material, and the base material may be cured in a predetermined mold to form the frame 100, the horizontal back beam 210, the first vertical back beam 220, and the second vertical back beams 230 into an integrated shape. Various types of reinforcing fibers may be used to make fiber reinforced plastics. For example, fiber reinforced plastic (FRP) including carbon fiber or glass fiber as a reinforcing fiber may be used, but the present invention is not limited thereto.

To minimize the weight while improving the rigidity of the frame 100, the horizontal back beam 210, the first vertical back beam 220, and the second vertical back beams 230, the portion of each of the frame 100, the horizontal back beam 210, the first vertical back beam 220, and the second vertical back beams 230 that faces a rear direction of the vehicle may be formed in a concave shape, and a plurality of ribs 300 may be formed inside the concave portion as shown in FIGS. 5 and 6. The shape of the rib 300 is not particularly limited, and the rib 300 may be formed to extend in a direction similar to the path of the load path L. In other words, the rib 300 may be used to assist the load path L, which is the path that transmits the amount of impact.

Although the entire structure of the frame 100 may be integrally formed with the horizontal back beam 210, the first vertical back beam 220, and the second vertical back beams 230 simultaneously, the upper member 110 and a pair of vertical members 130 of the frame 100 may be first integrally formed with the horizontal back beam 210, the first vertical back beam 220, and the second vertical back beams 230, and then, the lower member 120 may be additionally molded and integrally formed therewith. When the lower member 120 is manufactured by a separate process, the ribs 300 formed on the lower member 120 may be formed in the downward direction of the vehicle instead of the rear direction of the vehicle.

In particular, the upper member 110, the vertical members 130, the horizontal back beam 210, the first vertical back beam 220, and the second vertical back beams 230 may be integrally formed and the direction of the ribs 300 may be aligned in the rear direction of the vehicle to allow the upper member 110, the vertical members 130, the horizontal back beam 210, the first vertical back beam 220, and the second vertical back beams 230 to be removed without interference while removing the mold after molding. Thereafter, to mold the lower member 120, the integrated upper member 110, the vertical members 130, the horizontal back beam 210, the first vertical back beam 220, and the second vertical back beams 230 formed previously may be disposed inside the mold and the lower member 120 may be additionally molded, wherein by forming the direction of the ribs 300 of the lower member 120 in the lower direction of the vehicle, the process of removing the mold after molding may be simplified.

Accordingly, the integrated structure of the front-end module and the back beam, which is made of fiber reinforced plastic material and integrally molded, may reduce the number and weight of parts compared with a conventional FEM-back beam structure formed of a steel material while exhibiting a similar level of physical properties such as rigidity, thereby contributing to the reduction of the component price and the weight. Further, breakage of the back beam and the collision box may be prevented while a collisional load is absorbed with one back beam, thereby preventing injury to the occupants.

Although an exemplary embodiment of the present invention has been described for illustrative purposes, those skilled in the art will appreciate that various modifications, additions and substitutions are possible, without departing from the scope and spirit of the invention as disclosed in the accompanying claims.

It is thus well known to those skilled in that art that the present invention is not limited to the exemplary embodiment disclosed in the detailed description, and the rights of the present invention should be defined by the scope and spirit of the invention as disclosed in the accompanying claims. Accordingly, it should be understood that the present invention includes various modifications, additions and substitutions without departing from the scope and spirit of the invention as disclosed in the accompanying claims.

What is claimed is:

1. An integral type front-end module, comprising:
   a frame including an upper member, a lower member, and a pair of vertical members that connect the upper member and the lower member to form a quadrangular frame shape;
   a horizontal back beam that connects the pair of vertical members;
   a first vertical back beam that connects a middle portion of the upper member and a middle portion of the lower member; and
   a pair of second vertical back beams, each provided between one of the vertical members and the first vertical back beams to connect the upper member and the lower member to each other,
   wherein the frame, the horizontal back beam, the first vertical back beam, and the second vertical back beams are formed integrally.

2. The integral type front-end module of claim 1, wherein the horizontal back beam connects middle portions of the pair of vertical members to each other.

3. The integral type front-end module of claim 2, wherein the horizontal back beam includes a pair of straight portions that extend from the middle portions of the vertical members toward a front of a vehicle, and a curved portion disposed between the pair of straight portions and curved to gradually protrude toward the front of the vehicle.

4. The integral type front-end module of claim 1, wherein the first vertical back beam is formed in a curved shape wherein a middle portion thereof gradually protrudes toward the front of the vehicle from both ends thereof.

5. The integral type front-end module of claim 1, wherein a middle portion of the horizontal back beam and a middle portion of the first vertical back beam are integrally formed to cross each other.

6. The integral type front-end module of claim 1, wherein based on a distance between one of the vertical members and the first vertical back beam, each of the second vertical back beams is disposed at a location of about 45-55% of the distance from a corresponding vertical member.

7. The integral type front-end module of claim 1, wherein each of the second vertical back beams is formed in a curved shape wherein a middle portion thereof gradually protrudes toward the front of the vehicle from both ends thereof.

8. The integral type front-end module of claim 1, wherein a middle portion of the horizontal back beam and middle portions of the second vertical back beams are integrally formed to cross each other.

9. The integral type front-end module of claim 1, wherein a portion of each of the frame, the horizontal back beam, the first vertical back beam, and the second vertical back beams that faces a rear direction of a vehicle is concavely formed and includes a plurality of ribs formed therein.

10. The integral type front-end module of claim 1, wherein a portion of each of the vertical members that faces a rear direction of a vehicle is connected to a side member, to receive an impact applied to the horizontal back beam, the first vertical back beam, and the second vertical back beams and transmit the impact to the side member.

11. The integral type front-end module of claim 1, wherein the frame, the horizontal back beam, the first vertical back beam, and the second vertical back beams are made of a fiber reinforced plastic material.

12. The integral type front-end module of claim 11, wherein the frame, the horizontal back beam, the first vertical back beam, and the second vertical back beams are made of a glass fiber reinforced plastic material.

13. The integral type front-end module of claim 1, wherein each of the second vertical back beams is disposed at a location that corresponds to a corner of a barrier that collides with a vehicle in an offset collision test.

14. The integral type front-end module of claim 1, wherein the horizontal back beam forms a load path that transmits a load of a collisional impact to the vertical members, the first vertical back beam forms a load path that transmits the load of the collisional impact to the vertical members through the upper member and the lower member, and the second vertical back beams form load paths that transmit the load of the collisional impact to the vertical members through the upper member and the lower member.

\* \* \* \* \*